Sept. 20, 1955 W. C. WARD 2,718,377
POWER WINCH

Filed Feb. 13, 1953 3 Sheets-Sheet 1

INVENTOR.
WILLIAM C. WARD
BY
McMorrow, Berman & Davidson
ATTORNEYS

Sept. 20, 1955     W. C. WARD     2,718,377
POWER WINCH

Filed Feb. 13, 1953     3 Sheets-Sheet 2

INVENTOR.
WILLIAM C. WARD
BY
McMorrow, Berman + Davidson
ATTORNEYS

Sept. 20, 1955     W. C. WARD     2,718,377
POWER WINCH

Filed Feb. 13, 1953     3 Sheets-Sheet 3

INVENTOR.
WILLIAM C. WARD
BY
McMorrow, Berman & Davidson
ATTORNEYS

United States Patent Office 2,718,377
Patented Sept. 20, 1955

2,718,377
POWER WINCH
William C. Ward, Anderson, Calif.
Application February 13, 1953, Serial No. 336,676
4 Claims. (Cl. 254—187)

This invention relates to power winches and more particularly to an electric power winch adapted to be mounted on an automotive vehicle, such as a truck, and operated from the electrical system of the vehicle on which it is mounted.

It is among the objects of the invention to provide an improved power winch of small size and light weight which can be conveniently mounted on a suitable automotive vehicle and will exert a large pulling force on its associated cable; which is electrically actuated and can be operated from the electrical system of the associated vehicle; which is composed mainly of readily available components, such as vehicle engine starter motors, starter motor gears, a power transmitting chain and chain sprockets; which is power driven in both directions to wind in the cable and wind the cable off under tension; which has means for disconnecting the cable winding component thereof from the power means, so that the cable can be rapidly pulled out by hand when desired; and which is simple and durable in construction, economical to manufacture, easy to install, and effective and efficient in operation.

Other objects and advantages will become apparent from a consideration of the following description and the appended claims in conjunction with the accompanying drawings wherein:

Figure 1:
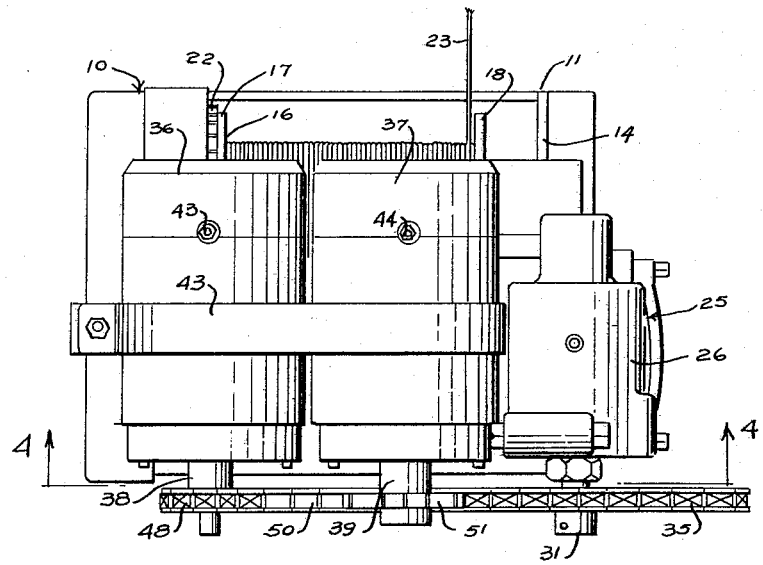
Figure 1 is a top plan view of a power winch illustrative of the invention, with the gear of the coupling unit engaged with the cable spool gear.
Figure 2:
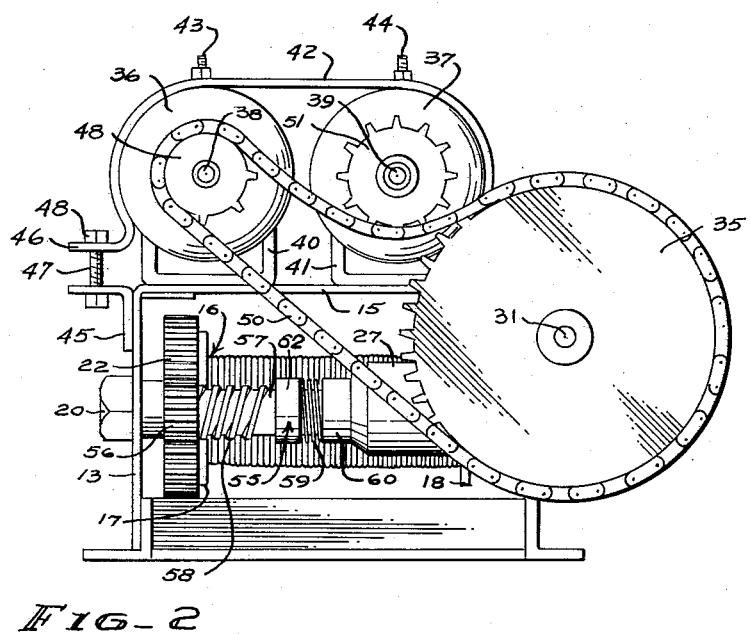
Figure 2 is an end elevational view of the winch illustrated in Figure 1.
Figure 3:
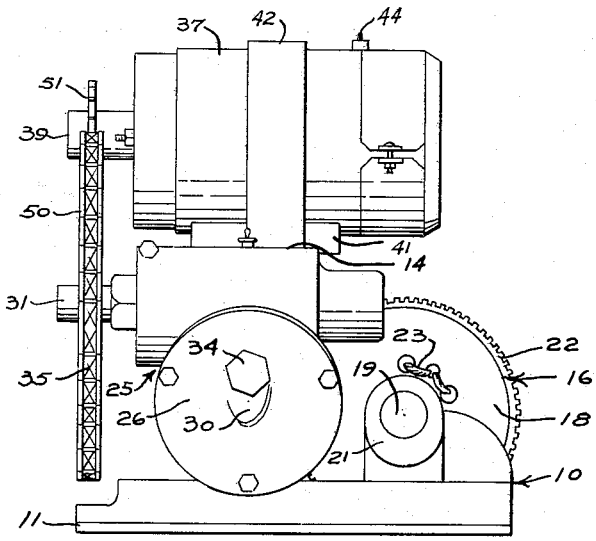
Figure 3 is a side elevational view of the winch.
Figure 4:
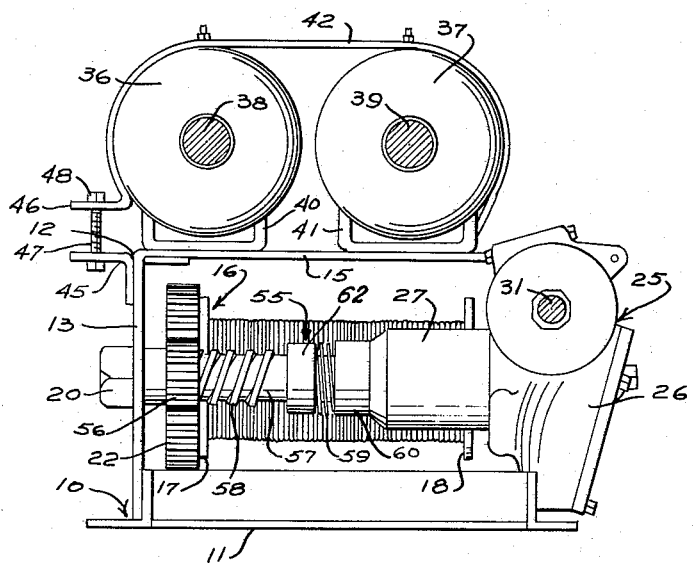
Figure 4 is a cross sectional view on the line 4—4 of Figure 1.
Figure 5:
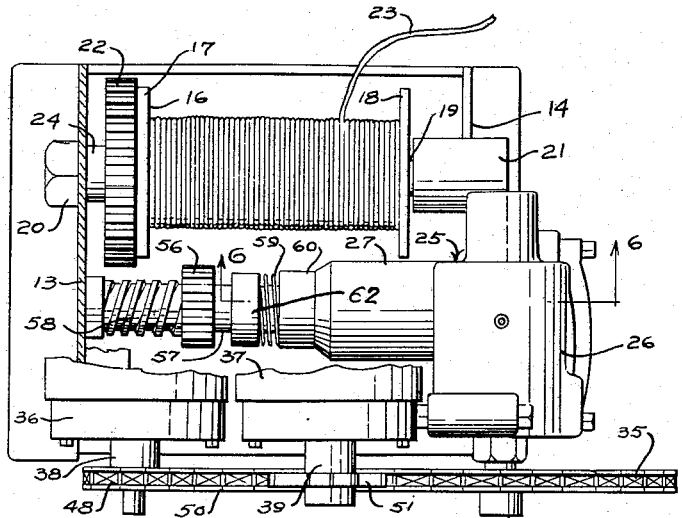
Figure 5 is a top plan view similar to Figure 1, but with parts broken away, showing the gear of the coupling unit disengaged from the cable spool gear.
Figure 6:
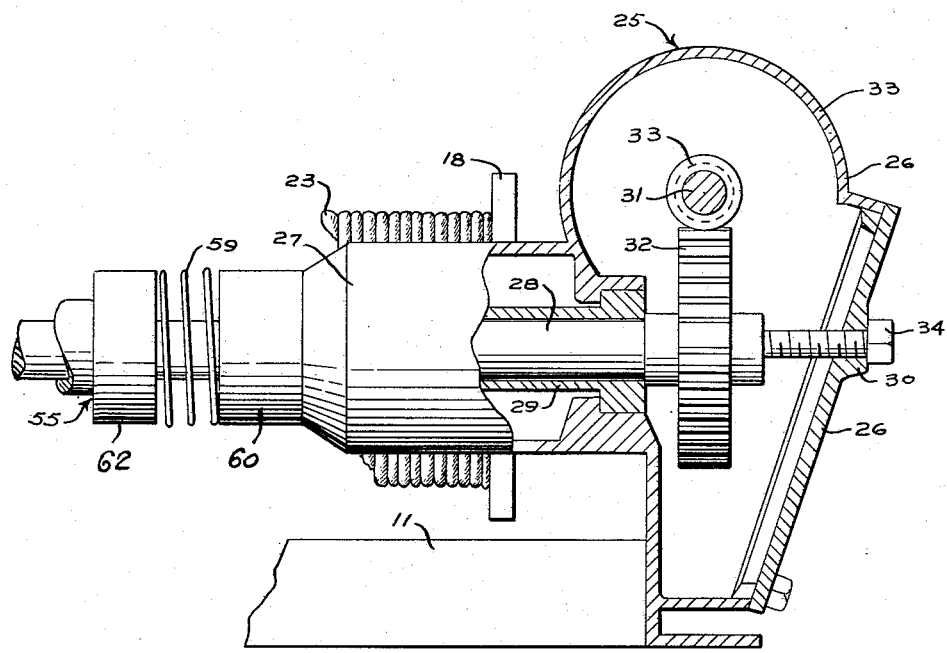
Figure 6 is a fragmentary cross sectional view on an enlarged scale on the line 6—6 of Figure 5.

With continued reference to the drawings, the winch comprises a frame, generally indicated at 10, including a base structure 11 of rectangular shape, and a substantially U-shaped structure 12 mounted at its open end on the base structure 11 and extending upwardly from the base structure with its legs 13 and 14 disposed substantially perpendicular to the base structure and its intermediate or bight portion 15 disposed above and substantially parallel to the base structure 11 and constituting the top of the frame.

A cable spool 16 having radially projecting flanges 17 and 18 of circular shape at its respectively opposite ends is disposed between the legs 13 and 14 of the frame and journaled on a spool shaft 19, the ends of which are supported in the frame legs 13 and 14. In the arrangement illustrated, the shaft 19 extends at one end through an aperture in the leg 13, and has on this end a head 20 disposed at the outer side of the frame leg and has its other end threaded into the screw threaded bore of a sleeve or nut 21 carried by the frame leg 14. One end of the cable drum bears against the adjacent end of the sleeve 21 and a spacer 24 surrounds the shaft 19 between the frame leg 13 and the adjacent end of the cable drum to hold the cable drum against end play on the shaft 19.

A spur gear 22 is journaled on the shaft 19 at one end of the spool 16 and drivingly connected to the adjacent end of the spool, and a cable 23 is connected at one end to the spool 16 and is normally wound on the cylindrical intermediate portion of the spool between the end flanges 17 and 18.

A reduction gear unit, generally indicated at 25, is mounted on the frame 10 at one end of the frame and includes a gear housing 26 having at one side an extension 27, the center line of which is substantially parallel to the rotational axis of the cable spool 16, a shaft 28 extending through the extension 27 into the housing 26 with its rotational axis substantially parallel to the rotational axis of the cable spool 16 and journaled in a bushing 29 carried by the housing 26, a second shaft 31 disposed above and at right angles to the shaft 28, a worm wheel 32 on the shaft 28 and a worm 33 on the shaft 31 meshing with the worm wheel 32 on the shaft 28 to provide a speed reducing driving connection between the shaft 31 and the shaft 28. The cover plate 26 is provided with a boss 30 having a screw threaded aperture and a bolt 34 is threaded through the boss 30 and bears at its end inwardly of the housing 26 against the adjacent end of shaft 28 to hold this shaft against end play. The shaft 28 is held exactly parallel to the shaft 19, so that a gear on shaft 28 will accurately mesh with the gear 22 on shaft 19.

The shaft 31 projects out of one end of the housing 26 and a chain sproket 35 is mounted on the shaft 31 outside of the housing 26. The shaft 31 is journaled at the opposite sides of the worm 33 in suitable bearings, not illustrated in detail, mounted in the housing 26.

Electric motors 36 and 37 are mounted in side by side relationship on the top 15 of the frame 10 and have shafts 38 and 39 respectively, the rotational axes of which are substantially parallel to the rotational axis of the shaft 31. The motors 36 and 37 are preferably starting motors used for starting the engines of automotive vehicles, and may be mounted on the frame top member 15 in any suitable manner. In the arrangement illustrated, motor bases 40 and 41 of channel shaped cross section are mounted on the frame top member 15 with their legs extending upwardly and the motor 36 rests upon the upper ends of the legs of the base 40, while the motor 37 rests upon the upper ends of the legs of the base 41. A metal strap 42 is secured at one end to the frame leg 14 and extended over the tops of both of the motors 36 and 37. An angle bracket 45 is secured to the frame leg 13 near the upper end of this leg and has an apertured portion projecting perpendicularly outwardly from the frame leg 13. The end of the strap 42 adjacent the frame leg 13 is bent outwardly and apertured to provide an apertured lug formation 46 and a clamp bolt 47 extends through the apertured portion of the angle bracket 45 and through the apertured lug 46 and receives a nut 48 to tighten the band or strap 42 about the motors 36 and 37 and secure the motors firmly to the frame 10 of the winch. Screw threaded binding posts 43 and 44 extend outwardly of the motor housings at the tops of the motors 36 and 37 respectively.

A chain sprocket 48 is mounted on the shaft 38 of the motor 36 and a power transmitting chain 50 is trained around the sprockets 48 and 35 to enable the motor 36 to drive the shaft 31 of the reduction gear unit 25 and, through the worm drive above described, drive the shaft 28. It will be noted that the sprocket 35 is much larger than the sprocket 48, so that a further speed reduction is provided by the chain drive from the motor shaft 38 to the reduction gear shaft 31.

A chain sprocket 51, somewhat larger than the sprocket 48, is mounted on the shaft 39 of the motor 37 and this sprocket is disposed outside of and above the chain 50, but is drivingly engaged with the chain, so that the sprocket 35 and shaft 31 may also be driven by the motor 37. It will be noted that the motor 36 drives the sprocket 35 in one direction, which is the direction for winding in the cable 23 on the cable spool 16, as will be later explained, while the motor 37 drives the sprocket 35 in the opposite direction, which is the direction for paying off cable under tension from the cable spool.

It is to be understood that suitable means, not illustrated, are provided for selectively energizing the motors 36 and 37 from the electrical system of the vehicle upon which the winch is installed, so that the sprocket 35 and shaft 31 can be rotated in either direction as selected by the operator of the winch.

An engine starting coupling unit, generally indicated at 55, is mounted on the shaft 28 at the outer end of the housing extension 27 and includes a spur gear 56 which is brought into mesh with the gear 22 connected to the cable spool 16 when the cable spool is driven in its cable winding direction from the motor 36.

The coupling unit 55 comprises a sleeve 57 which is rotatably mounted on the shaft 28, the sleeve 57 having the gear 56 movably mounted thereon. The sleeve 57 has on its outer surface a screw formation 58 which is in threaded engagement with the screw threaded bore in the gear 56. The sleeve 57 is connected to the shaft for rotation therewith by means of a flexible coupling consisting of a collar 60 fixed on the shaft 28, a collar 62 fixed on the sleeve 57, and a coil spring 59 circumposed on the shaft 28 and having its ends attached to the collars 60 and 62.

With this arrangement, when the shaft 28 is driven in a forward direction, the threaded formation 58 on the sleeve 57 threads through the gear 56 and moves the gear 56 into mesh with the gear 22, thus driving the cable spool 16, the rotation of the shaft 28 being imparted to the sleeve 57 through the flexible coupling or spring 59 and collars 60 and 62 coupling the sleeve 57 to the shaft 28 for rotation with the latter. The starter drive 55 thus provides a one-way driving connection between the speed reducing gear unit 25 and the cable spool 16.

As explained above, the motor 36 drives the shaft 28 through the chain drive and the speed reducing gear unit in a direction to move the gear 56 into mesh with the gear 22 and rotate the cable drum 16 in a direction to wind in the cable 23 onto the drum. Assuming that the free end of the cable has been connected to a load and the motor 36 energized, the winch will then wind in the cable, moving the load toward the winch and, if the winch or a portion of the cable leading to the winch is disposed above the load, elevating the load as the cable is wound in. During the operation of the motor 36 the un-energized motor 37 merely rotates, but has no effect on the operation of the winch.

Assuming now that the load has been brought up to the desired position and that the cable 23 remains under tension, because of the pull thereon due to elevation of the load or other causes, and it is desired to release the cable from the load, the worm drive of the reduction gear unit being irreversible, so that it will hold the load at any position to which the load is moved by the cable, with the motor 36 de-energized, the motor 37 is now energized to rotate the shaft 28 in a direction to pay off the cable from the cable spool 16. Because of the pull on the cable the gear 56 will be maintained in mesh with the gear 22 until the cable has been slackened. As soon, however, as the cable becomes slack, the cable drum 16 and the gear 22 discontinue rotation and a further operation of the motor 37, after the cable has become slack, will cause the threads 58 on the sleeve 57 to thread through the gear 56 and move this gear out of mesh with the gear 22. This releases the cable spool from the power drive, so that at this time, the cable can be pulled off of the spool by the operator, if desired, without resistance from the spool driving mechanism and without the necessity of energizing either of the motors.

The winch thus provides power means for winding in the cable, power means for slacking the cable from a taut to a slack condition, and means for releasing the cable drum so that the cable may be pulled off freely, and at a rapid rate, when it is desired to attach the free end of the cable to a load.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A power winch adapted to be mounted on an automotive vehicle and driven from the electrical system of the associated vehicle comprising a frame, a cable spool journaled on said frame, a cable connected to said spool and adapted to be wound thereon, electric motors mounted on said frame and adapted to be energized from the electrical system of the associated vehicle, a reduction gear unit mounted on said frame, means drivingly connecting said motors to said reduction gear unit for driving the latter in respectively opposite directions when said motors are alternatively energized, and means including a one-way drive mechanism drivingly connecting said reduction gear unit to said cable spool whereby said cable can be wound in by energizing one of said motors, let out under tension by energizing the other of said motors and pulled out freely from said spool with both of said motors de-energized.

2. A power winch adapted to be mounted on an automotive vehicle and driven from the electrical system of the associated vehicle comprising a frame, a cable spool journaled on said frame, a cable connected to said spool and adapted to be wound thereon, electric motors mounted on said frame and adapted to be energized from the electrical system of the associated vehicle, a speed reducing irreversible worm gear drive mechanism mounted on said frame, means drivingly connecting said motors to said worm drive mechanism for driving the latter in respectively opposite directions when said motors are alternatively energized, and means including a one-way drive mechanism drivingly connecting said worm drive mechanism to said cable spool whereby said cable can be wound in by energization of one of said motors, let out under tension by energization of the other of said motors and pulled out freely from said spool with both of said motors de-energized.

3. A power winch adapted to be mounted on an automotive vehicle and driven from the electrical system of the associated vehicle comprising a frame, a cable spool journaled on said frame, a cable connected to said spool and adapted to be wound thereon, electric motors mounted on said frame and adapted to be energized from the electrical system of the associated vehicle, a speed reducing irreversible worm drive mechanism mounted on said frame, means drivingly connecting said motors to said worm drive mechanism for driving the latter in respectively opposite directions when said motors are alternatively energized and providing for driving of said reduction gear unit by one of said motors at a speed greater than the speed at which said reduction gear unit is driven by the other of said motors, and means including a one-way drive mechanism drivingly connecting said reduction gear unit to said cable spool whereby said cable can be wound in by energization of one of said motors, let out under tension by energization of the other of said motors and pulled out freely from said spool with both of said motors de-energized.

4. A power winch adapted to be mounted on an automotive vehicle and driven from the electrical system of the associated vehicle comprising a frame, a cable spool journaled on said frame, a cable connected to said spool and adapted to be wound thereon, electric motors mounted on said frame and adapted to be energized from the electrical system of the associated vehicle, a speed reducing irreversible worm drive mechanism mounted on said frame, means drivingly connecting said motors to said worm drive mechanism for driving the latter in respectively opposite directions when said motors are alternatively energized, a gear drivingly connected to said spool, and an engine starting clutch mechanism providing a one-way driving connection between said worm drive mechanism and said gear whereby said cable can be wound onto said spool by energization of one of said motors, let out from said spool under tension by energization of the other of said motors and pulled out freely from said spool with both of said motors de-energized and said engine starting clutch mechanism disengaged.

References Cited in the file of this patent

UNITED STATES PATENTS

| | | |
|---|---|---|
| 1,473,248 | Norris | Nov. 6, 1923 |
| 1,623,021 | Smaltz | Mar. 29, 1927 |
| 1,843,291 | McConnell | Feb. 2, 1932 |
| 2,282,731 | Larsen et al. | May 12, 1942 |
| 2,602,635 | Young | July 8, 1952 |